July 28, 1936.  F. W. SMITH  2,049,331
DISPENSING DEVICE
Filed Sept. 13, 1933  2 Sheets-Sheet 1

Inventor
Frederick Woodson Smith
By
Attorney

July 28, 1936.    F. W. SMITH    2,049,331
DISPENSING DEVICE
Filed Sept. 13, 1933    2 Sheets-Sheet 2
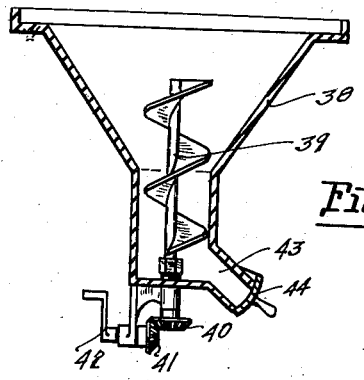
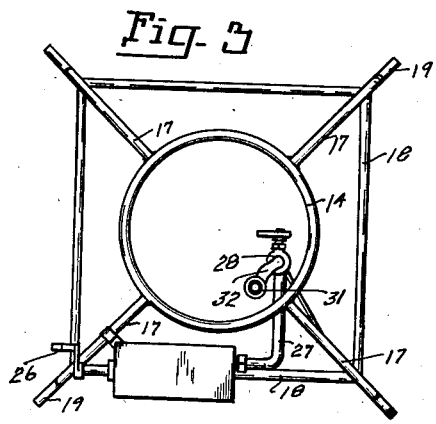
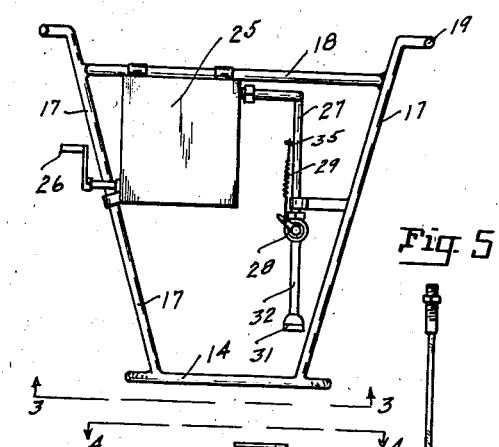
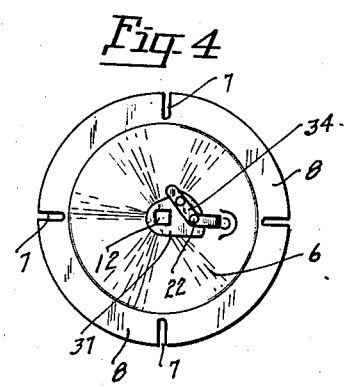
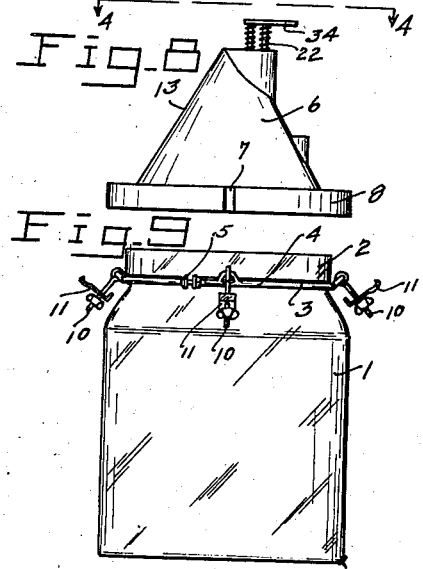
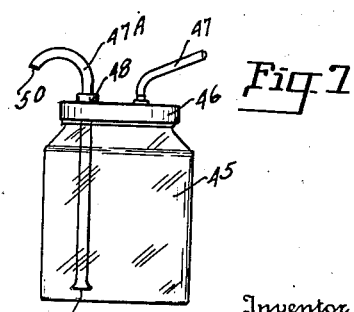
Inventor
Frederick Woodson Smith
By Thomas Bilyeu
Attorney Patented July 28, 1936

2,049,331

UNITED STATES PATENT OFFICE 2,049,331

DISPENSING DEVICE

Frederick Woodson Smith, Milwaukie, Oreg.

Application September 13, 1933, Serial No. 689,211

5 Claims. (Cl. 221—74)

The invention is comprised primarily of a container preferably made of acid resisting material. A dispensing hood is removably adaptable to the open end of the container and may be hermetically sealed relative thereto. A leg support is adapted to the hood and is so made as to maintain the container in an inverted position.

The hood has a discharge outlet and a manually manipulative valve is adapted thereto. An air vent is removably placeable through the hood into the container and means is provided for admitting a compressible fluid under pressure into the container through the vent for forcing the materials from a container through the hood and the discharge outlet.

My invention is primarily intended for use for the dispensing of mayonnaise, peanut butter and other semi-fluid food products. The dispensing may be aided through the introduction into the food container of a compressible fluid under pressure.

The primary purpose and object of my invention is to facilitate the dispensing of semi-fluid food products in a highly sanitary condition.

A further object of my invention is to provide a device for the dispensing of fluid food products quickly and without delay.

A still further object of my invention consists in providing a device for the dispensing of food products from a large container without the use of paddles, ladles and the like.

And a still further object of my invention consists in so constructing my dispensing device that the food products may be contained or stored therein without exposing them to contamination of bacteria and other foreign matter that normally floats in the air.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 2 is an inverted side view of the leg support for the head and container.

Fig. 3 is a plan view of the leg supporting device, being taken on line 3—3 of Fig. 2.

Fig. 4 is a plan view of the hood, being taken on line 4—4 of Fig. 8.

Fig. 5 is a side view of the vent shown removed from the container.

Fig. 6 is a side view of a modified form of dispensing hood illustrating an agitator disposed at the discharge port of the head.

Fig. 7 is a side view of a container having a head secured thereto and through which the ejecting fluid is admitted into the top of the container. In this view a dispensing spout is disposed, the bottom end of which is adapted for being moved toward and away from the bottom of the container.

Fig. 8 is an inverted side view of the head shown in position for being inserted within the top end of the support therefor, and Fig. 9 is a side view of the open ended container.

Figure 1:
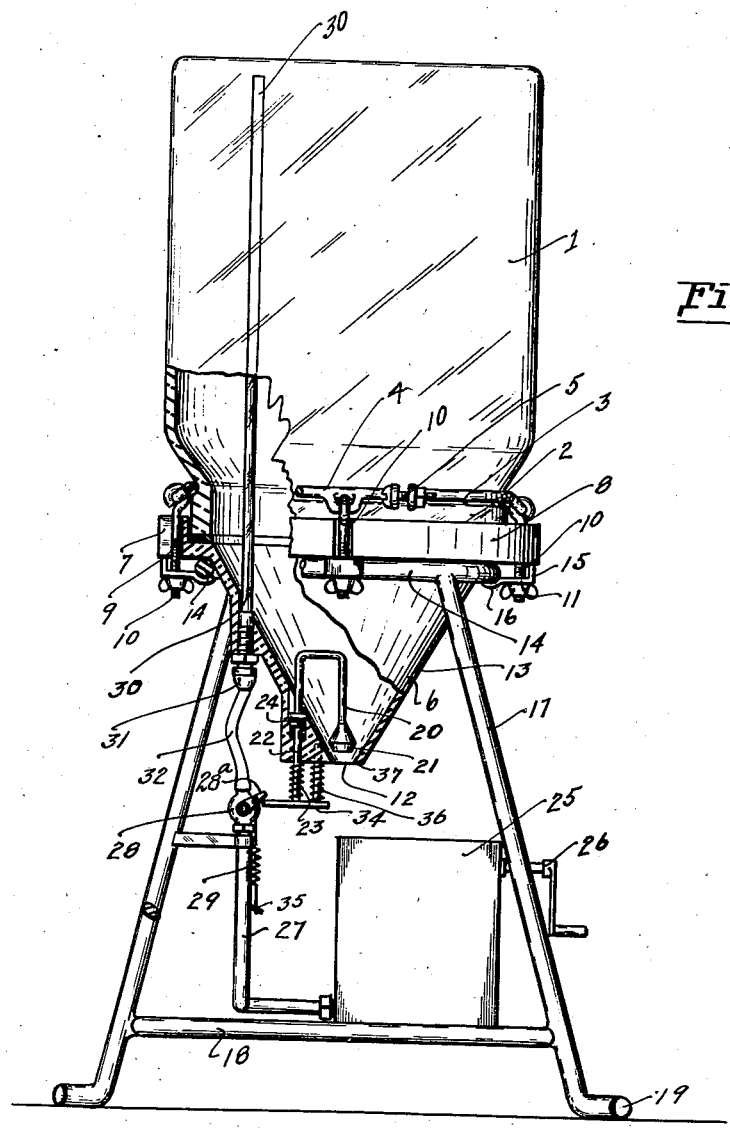
Fig. 1 is a side view partially in section of the assembled device.

In Figs. 2, 8, and 9, the support, the head and container are shown in spaced relation with each other and in position to be placed one upon the other with the open ended container in intimate contact and engagement with the head and illustrating means for clamping the container to the dispensing head.

Like reference characters refer to like parts throughout the several views.

1 is the container that is normally used for the shipping and storing of bulk mayonnaise, peanut butter and other semi-fluid products. The containers are usually made of glass, porcelain or similar acid-resisting material, and have a relatively large neck 2. The neck being circumferentially recessed at 3, which is the juncture of the neck and body of the jar, provides for the attaching of a collar 4 therearound. The collar 4 is adapted for being tightened about the recess 3 through the use of a clamping screw 5. A hood 6 is provided for attachment to the open end of the container 1.

The hood 6 is constructed in the form of a frustro-cone 13 and has a peripheral shoulder 8A and flange 8 at is greater opening. A discharge port 12 is formed at its opposite end. The interior of the shoulder 8A is adapted to engage the rim 2A of the jar 1, and the inner periphery of the flange 8 fits about the neck 2 of the jar 1. A compressible gasket 9 is disposed between the rim 2A and the shoulder 8A.

A plurality of bolts 10 are hingedly secured to the collar 4 and register with slots 7 that are spaced about the periphery of the flange 8.

A stand is provided and consists of a band 14 which is supported by legs 17. The legs are tied together and braced by cross bars 18, the cross bars being adjacent the lower end of the legs 17. The legs 18 terminate in feet 19.

The shoulder 8A rests upon the band 14 of the stand and the jar 1, hood 6 and stand are secured together in the following way. As previously described the hinged bolts 10 register with the slots 7 in the flange 8. Washers 11 have a leg 15 projecting substantially at right angles from the washer that is adapted to contact the shoulder 8A, and having a curved portion 16 that is adapted to engage the underside of the band 14. The bolts 10 pass through the washers and when the wing nuts 10A are tightened the three units are secured together, the jar 1 being hermetically sealed relative to the hood 6.

After the leg and hood assembly have been secured to the container, the assembly is then inverted so that the materials, disposed within the container to be dispensed, will flow by gravity from the container into the hood 13. A manually manipulative valve 20 is adapted to the hood and has a valve head 21 so shaped and fashioned as to act as a closure for the discharge port 12. The U-shaped stem 22 of the valve extends through the side wall of the hood to facilitate its being manipulated. A compressible element, as a coil spring 23 disposed between the hood and the handle 34, normally maintains the valve head 21 seated relative to the discharge port. A stuffing gland 24 is disposed about the valve stem 22 and hermetically seals the point of entrance of the valve stem into the hood. A tank 25 rests within the leg support and means is provided for maintaining a fluid under pressure within the tank. This may be accomplished through the use of a hand pump 26. A compressible fluid may be stored within the tank 25. A pipe 27 is secured to the tank 25 and a valve 28 is disposed within the pipe. The valve 28 is normally maintained closed through the action of a reacting element, as a coil spring 29. A sleeve member 30A is threadably secured within the wall of the hood and a vent tube 30 is secured within the sleeve member. The vent tube 30 extends to a point adjacent the bottom of the jar and is removable from the sleeve member 30A. A flexible tube 32, provided with a fluid tight joint 31 at the sleeve 30A, connects the valve 28 with the venting tube 30.

It is found desirable to have the valve handle 34 extend to a point where it will engage actuating lever 28A of the valve 28 in order that the manipulation of the valve stem for releasing the flow of material from the container will simultaneously admit the fluid under pressure from the tank 25 into the top of the container.

A guide pin 36A is slidable within the boss portion of the hood 6 and is secured to the handle 34. A coil spring 36 is disposed about the pin 36A between the boss and the handle and aids the spring 23 in maintaining the valve 21 in closed position. The pin 36A serves to maintain the handle 34 in alignment with the valve lever 25 and also serves to limit the amount of opening of the valve 21 and valve 28.

Where the device is made as illustrated and disclosed herein a receptacle is placed beneath the port 12 and when a sufficient amount of material has been dispensed through the port 12 into a receptacle, the material is wiped from the lower edge 37 of the hood by the receptacle itself.

In Fig. 6 I have shown the hood 38 as being so shaped to facilitate its attachment to the open end of the container. An agitator 39 is vertically disposed within the hood and a bevel gear 40 is disposed upon the lower end of the agitator. The bevel gear 41 coacts with the bevel gear 40 and the gears and the agitators are turned by a hand crank 42. The discharge port 43 of the hood 38 is disposed at one side and a cut-off valve 44 is hingedly secured to the hood and is shaped to precisely fit the outer surface of the discharge port. A device thus made mixes the material before being exuded from the container through the hood and delivers to the consumer a uniformly mixed product.

For smaller containers and for some materials, the device may be made as illustrated in Fig. 7.

A tube 47 is secured to the hood 46 and admits a fluid under pressure into the vacant end of the container 45. An exuding spout 47A passes through the hood 46 and has a packing gland 48 disposed thereabout at the point of egress from the hood. The lower end 49 of the dispensing tube 47A may be moved toward and away from the bottom of the container 45. The upper end of the tube is bent to facilitate the placing of a receiving receptacle below the discharge point 50 of the tube 47.

While the form of mechanism herein shown and described is admirably adapted to fulfill the objects primarily stated, it is to be understood that it is not intended to confine the invention to the embodiment herein shown and described, as it is susceptible of embodiment in various forms, all coming within the scope of the claims which follow.

What I claim is:

1. In a device of the class described, the combination of an open ended container, a collar removably attachable about the open end of the container, a frusto-conical hood having a discharge port and being secured to the open end of the container, means associated with the collar for hermetically sealing the hood relative to the container, a manually manipulative valve secured to the discharge port of the hood, means for normally maintaining the valve seated to close the discharge port, a frame for supporting the container in a position with the open end at the bottom, means controlled by the discharge port valve handle for admitting a compressed fluid into the container and means for securing the container and hood assembly to the frame.

2. In a device of the class described, the combination of an open ended container, a hood securable to the open end of the container and communicating with the interior of the container, means for hermetically sealing the hood to the open end of the container, means for supporting the assembled container in a position with the open end at the bottom, a discharge port disposed in the hood, valve means for normally maintaining the port closed, a venting tube extending through the hood and into the container, means for hermetically sealing the venting tube relative to the hood, means for admitting a compressible fluid under pressure through the venting tube and into the container, and means for opening the valve disposed at the discharge port of the hood and for releasing the fluid under pressure into the venting tube simultaneously.

3. In a device of the class described, in combination with an open ended standard storage container, a frusto-conical hood hermetically sealable to the open end of the container, means for supporting the container in a position with the open end at the bottom, a discharge port in the hood, a manually manipulative valve secured to the discharge port, a compressed fluid storage means disposed within the container supporting means, a pipe line communicating between the storage means and the interior of the container, a valve disposed in the pipe line, said valve being actuated by the discharge port valve actuating means to admit compressed fluid into the container simultaneously with the withdrawal of container contents.

4. In a device of the class described, the combination of a standard storage container having a downwardly disposed open end, a hood adapted to the container, a discharge port formed in the hood, an agitator journaled within the hood adjacent the discharge port and extending within the hood, manually manipulative means for actuating the agitator and means for admitting a compressed fluid into the container.

5. In a device of the class described, the combination with a standard storage container of a hood, a discharge port formed integral with the frusto-conical hood hermetically sealable to the container, means for supporting the container with the open end at the bottom, means journaled within the hood for agitating material to be exuded through the discharge port, means for opening and closing the discharge port and pneumatic means for admitting a compressed fluid into the container.

FREDERICK WOODSON SMITH.